US008205165B2

(12) United States Patent
Dal Lago

(10) Patent No.: US 8,205,165 B2
(45) Date of Patent: Jun. 19, 2012

(54) APPARATUS TO CREATE, SAVE AND FORMAT TEXT DOCUMENTS USING GAZE CONTROL AND METHOD ASSOCIATED BASED ON THE OPTIMIZED POSITIONING OF CURSOR

(75) Inventor: Gianluca Dal Lago, Milan (IT)

(73) Assignee: SR Labs S.R.L., Brescia (IT)

( * ) Notice: Subject to any disclaimer, the term of this patent is extended or adjusted under 35 U.S.C. 154(b) by 32 days.

(21) Appl. No.: 12/922,236

(22) PCT Filed: Mar. 11, 2009

(86) PCT No.: PCT/IB2009/051007
§ 371 (c)(1),
(2), (4) Date: Sep. 13, 2010

(87) PCT Pub. No.: WO2009/113026
PCT Pub. Date: Sep. 17, 2009

(65) Prior Publication Data
US 2011/0022950 A1     Jan. 27, 2011

(30) Foreign Application Priority Data
Mar. 12, 2008   (IT) .................. FI08A0049

(51) Int. Cl.
*G06F 3/048*   (2006.01)
*A61B 1/10*    (2006.01)
*G09G 5/00*    (2006.01)

(52) U.S. Cl. ........ 715/764; 715/256; 715/786; 715/856; 351/205; 351/209; 345/157; 345/684

(58) Field of Classification Search .................. 715/200, 715/201, 202, 205, 209, 210, 231, 234, 253, 715/254, 256, 700, 760, 762, 764, 765, 768, 715/784, 785, 786, 830, 856; 345/14, 156, 345/157, 160, 594, 661, 684; 351/41, 42, 351/200, 202, 203, 205, 206, 209, 211, 222, 351/223

See application file for complete search history.

(56) References Cited

U.S. PATENT DOCUMENTS

| 6,204,828 B1* | 3/2001 | Amir et al. ......................... 345/7 |
| 6,433,759 B1* | 8/2002 | Richardson et al. ............... 345/7 |
| 6,873,314 B1* | 3/2005 | Campbell ..................... 345/156 |

(Continued)

FOREIGN PATENT DOCUMENTS
EP    1 255 225 A3 *  3/2004
(Continued)

OTHER PUBLICATIONS

Steptoe et al. "Eye Tracking for Avatar Eye Gaze Control During Object-Focused Multiparty Interaction in Immersive Collaborative Virtual Environments", IEEE, 2009, pp. 83-90.*

(Continued)

*Primary Examiner* — Maikhanh Nguyen
(74) *Attorney, Agent, or Firm* — Abelman, Frayne & Schwab

(57) ABSTRACT

The method and the apparatus object of present invention refers to a system and A method that create, save and format text documents using a device with gaze control and a system of quick positioning of the cursor. The present invention provides a faster interaction and requires a minimum effort with respect to the state of the art interfaces.

4 Claims, 5 Drawing Sheets

U.S. PATENT DOCUMENTS

| | | | | |
|---|---|---|---|---|
| 7,029,121 | B2 * | 4/2006 | Edwards | 351/246 |
| 7,556,377 | B2 * | 7/2009 | Beymer | 351/210 |
| 7,809,160 | B2 * | 10/2010 | Vertegaal et al. | 345/157 |
| 2004/0075645 | A1 * | 4/2004 | Taylor et al. | 345/157 |
| 2004/0156020 | A1 * | 8/2004 | Edwards | 351/209 |
| 2005/0108092 | A1 * | 5/2005 | Campbell et al. | 705/14 |
| 2006/0256083 | A1 | 11/2006 | Rosenberg | |
| 2007/0164990 | A1 * | 7/2007 | Bjorklund et al. | 345/156 |
| 2009/0086165 | A1 * | 4/2009 | Beymer | 351/210 |
| 2009/0146950 | A1 * | 6/2009 | Maringelli | 345/158 |

FOREIGN PATENT DOCUMENTS

| | | |
|---|---|---|
| WO | 2007/017500 A | 2/2007 |
| WO | 2007/050029 A | 5/2007 |

OTHER PUBLICATIONS

Liu et al. "Real Time Auto-Focus Algorithm for Eye Gaze Tracking System", IEEE, 2007, pp. 742-745.*

PCT International Search Report, mailed Dec. 9, 2009, for PCT/IB2009/051007.

* cited by examiner

APPARATUS TO CREATE, SAVE AND FORMAT TEXT DOCUMENTS USING GAZE CONTROL AND METHOD ASSOCIATED BASED ON THE OPTIMIZED POSITIONING OF CURSOR

FIELD OF THE INVENTION

The present invention is related to the field of interaction techniques in gaze control system interfaces, and in particular to a new system that allows to create, save and format text document using eye tracking devices through a method of fast cursor positioning.

STATE OF THE ART

One of the goal of research in the human-computer interaction field has been and it is, till now, the increase of bandwidth of communication between the user and the machine, because with the introduction of the GUI (graphical user interface), the bandwidth of output data has increased while the bandwidth of input data has remained mostly the same.

For this purpose several attempts have been made in using eye tracking to decrease the gap between output and input communication bandwidth and since the technology has become robust, accurate and economic enough, there is now a need for a real human-computer interface that makes use of inputs from eye-tracking devices in application development.

It is therefore necessary to find "interaction techniques" suitable for ocular movements so that to create a dialog user-computer, natural and advantageous, since an user interface based on such input is potentially faster and requires less effort with respect to the current interfaces.

This interface is difficult to develop for many reasons and in particular because the eyes are perceptive organs and the gaze moves on the screen also when the user records information and he doesn't want to produce any type of control command. moreover the user, who can be a person with disabilities, can have difficulties to control his own gaze with accuracy high enough to control the computer as desired and this is particularly emphasized if the objects to control on the screen is small.

IN the state of the art there are a lot of systems that in different ways have tried to develop interaction methods based on the complete management of mouse emulation. In particular, some of them provide a pointer movement as a function of gaze movement.

An example is international patent application WO2007/017500 disclosing a standard eye-tracking device for a computer system executing the steps of displaying a user interface, tracking gaze coordinates and processing data related to said gaze coordinates in order to determine which action is to be performed according to the user gazing activity.

One of these interaction techniques magnifies the areas present on the screen so that the user can carry out an action in a more reliable way using the pointer and allows to gain access practically to all Windows applications.

In these cases such solution isn't the best because the potential of visual input are reduced to a simple copy of mouse features (moving the cursor with the eyes). Unlike the gesture of arms and hands, stable and directly associated with the voluntary action, the eyes movement shows other features, and it is often unintentional and oriented to acquire information about the external world and don't show a stable trend. Besides this interaction technique tires the user, slows down the interaction with the artefact and produces a high number of errors.

In another system the cursors is placed, in approximate way, on the start of gazed word, after a dwell time or pressing the switch. To move the cursor from letter to letter, after gazing a desired word for a certain time (dwell time), the user must gaze the arrow in the right direction among the 4 shown around the gazed word (a set of 4 arrows into 4 directions). To move slowly the cursor the user must gaze in the appropriate direction.

Besides is present a particular navigation screen where some buttons provide to move the cursor in all directions, both for small and large movements. To select a text to copy or cut, the user must place the cursor to the start of that text, select a particular button and move the cursor to the end of text to select.

Other systems show a solution of cursor positioning that combines ocular and manual control; when a manual activation of the user is noticed, the cursor is placed on starting position determined by the user gaze into the selected area.

In other more systems, the area of the screen gazed by the user enlarges so that the objects selection has made easy; the components outside this area close up and/or move in relation to such expansion.

SUMMARY OF THE INVENTION

It is an object of the present invention a method and an apparatus to process text document that uses as input the gaze and a method of fast positioning of cursor, developing an interface intuitive and easy to use as described into the claims that are integral part of the present description.

This apparatus represents a possible layout of an assistive technology extremely innovative to create, save and format text document, based on use of input natural and alternative, as the gaze.

DETAILED DESCRIPTION OF THE INVENTION

In a preferred embodiment of the present invention, the apparatus object of the present invention includes means of data and information processing, means of storage of said data and information and means to interface it with the user.

Said means of electronic processing of data and information include an appropriate control section, preferably based on at least a microprocessor and, for instance can be carried out from a personal computer.

Figure 1:
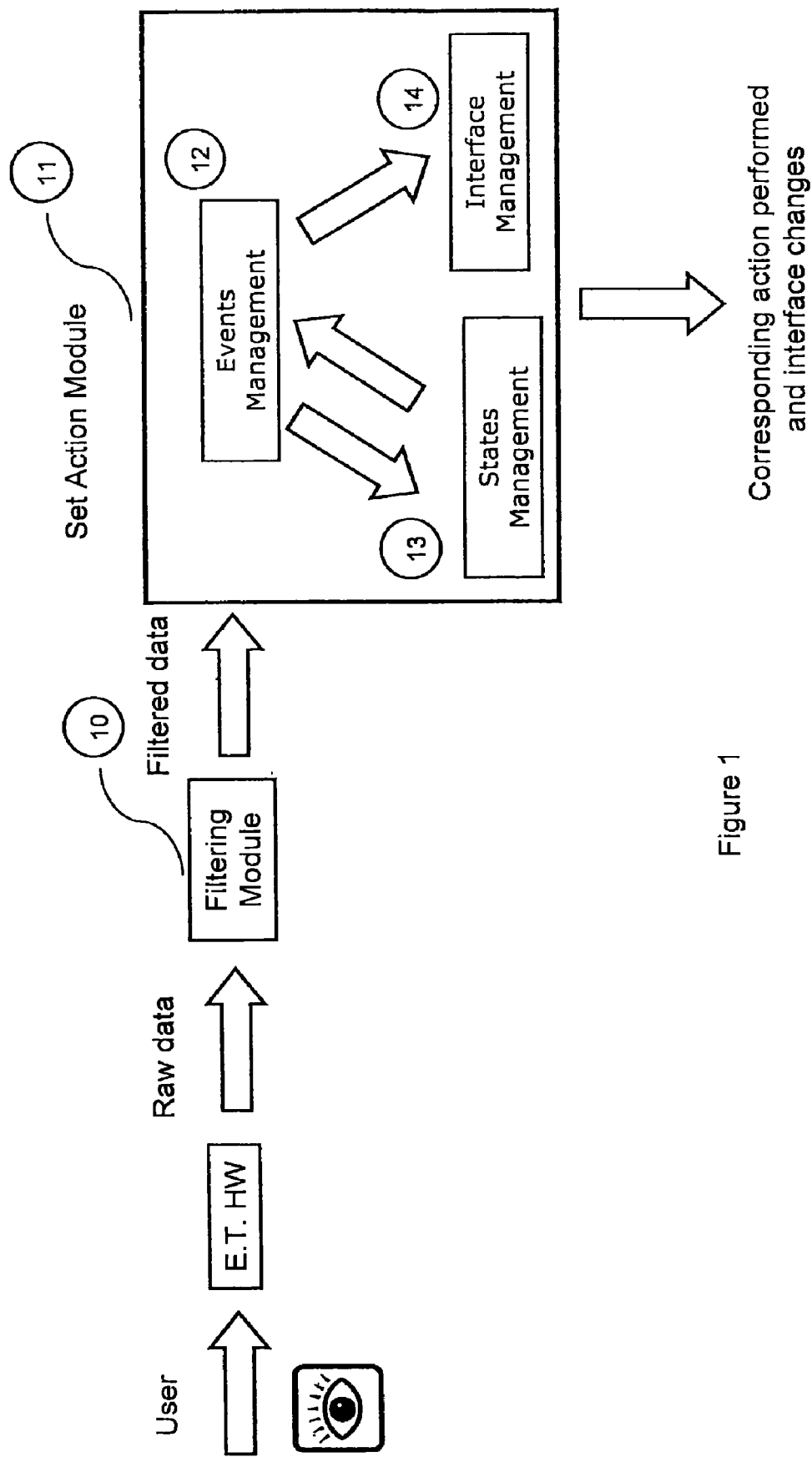
FIG. 1 Shows a block diagram of the architecture of the method according to the present invention.

Said means of storage include preferably hard disk and flash memory aid means of user interface include means of data visualization, like display, monitor or similar external output unit and eye tracking device to determine the direction of the user gaze. Said at least microprocessor is preferably equipped with an appropriate software program which architecture, described in FIG. 1, includes the following modules: a filtering module 10 that processes the user gaze coordinates and makes raw data, coming from eye tracking device, more stable;

a Set Action module 11, that manages graphic interface of the application and that holds the information about the areas components of the interface the user interacts with, and it is responsible to determine which area is currently gazed by the user, the action to perform and carries out it. Said Set Action module 11 holds the information about the action type associated with the activation of a determined component. Said Set Action module 11 is formed by three component modules: Events Management Module 12 that determines the rules to transform the input on the interface into changes on the application states through a mapping between the user action and application reply; a States Management Module 13 that represents the application data and determines the state and the functionalities and an Interface Management Module 14 that represents the visualization of interface objects, and manages the application graphic interface because holds the information related to the areas components of the graphic interface with which the user can interact and determines the interface area currently gazed by the user.

Referring to the FIG. 2 the flowchart that represents the connections among the modules previously described is illustrated below and the steps of method according to the present invention are shown.

a) The user interface of the application, that realises the method in accordance with the present invention and that allows the user to interact with said program through an eye tracking device associated to said electronic processor, is displayed 20 on means of visualization associated to said electronic processor.

b) The user gaze coordinates, as raw data, are calculated 21 from eye tracking device, and represent the gaze coordinates along the axis coordinate obtained with the frequency typical of said eye tracking device.

c) Raw data related to said coordinates are filtered 22 so that render it more stable and suitable to provide information about the user fixations, that is the number of user gaze around a certain area.

d) The filtered data coming from the previous step are sent to Set Action Module 23.

e) The corresponding action is performed 24 and the user interface of the application changes in reply to the action itself.

f) Return to the above step b) till when the user chooses to exit from the application.

Figure 2:
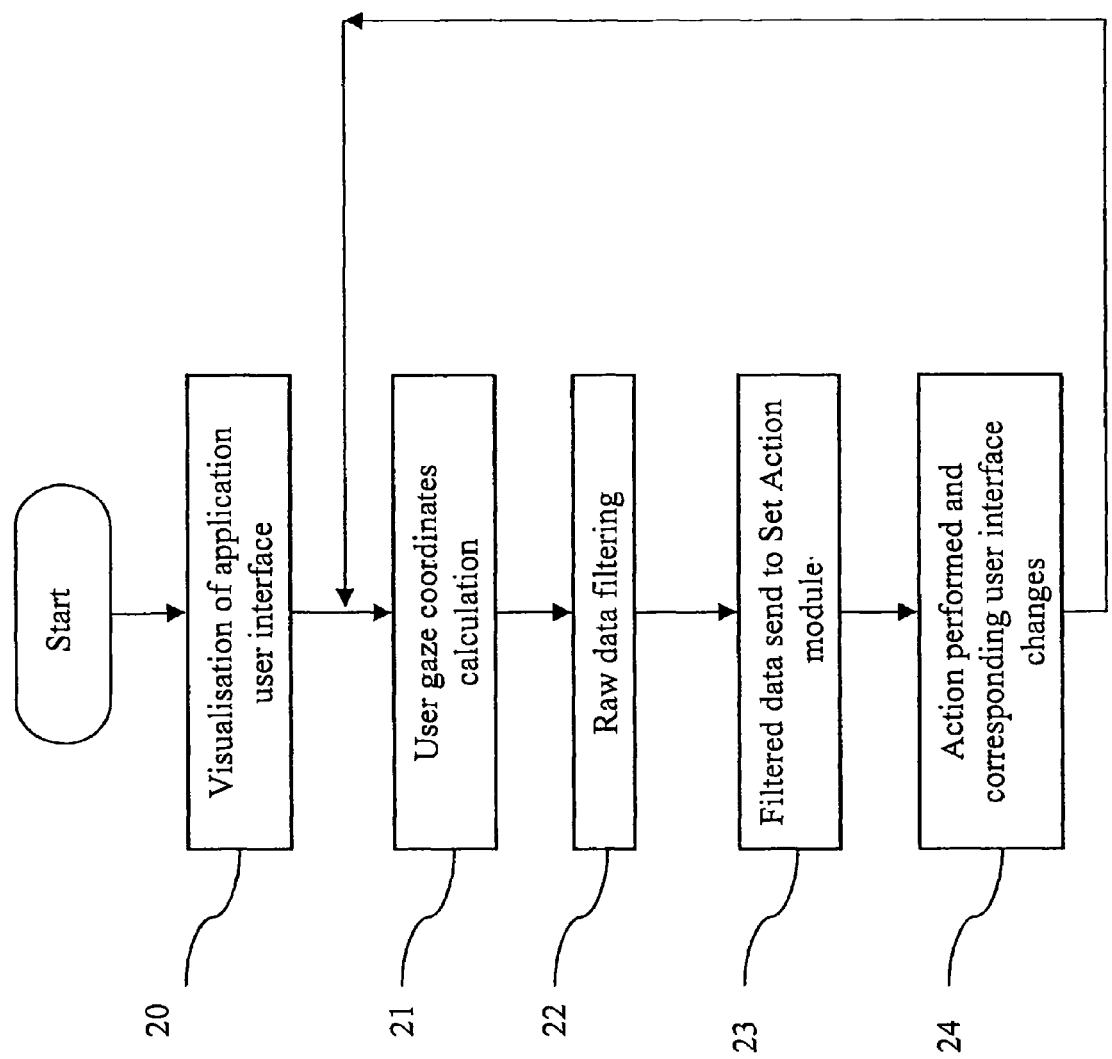
FIG. 2 Shows the flow chart of the method according to the present invention.
Figure 3:
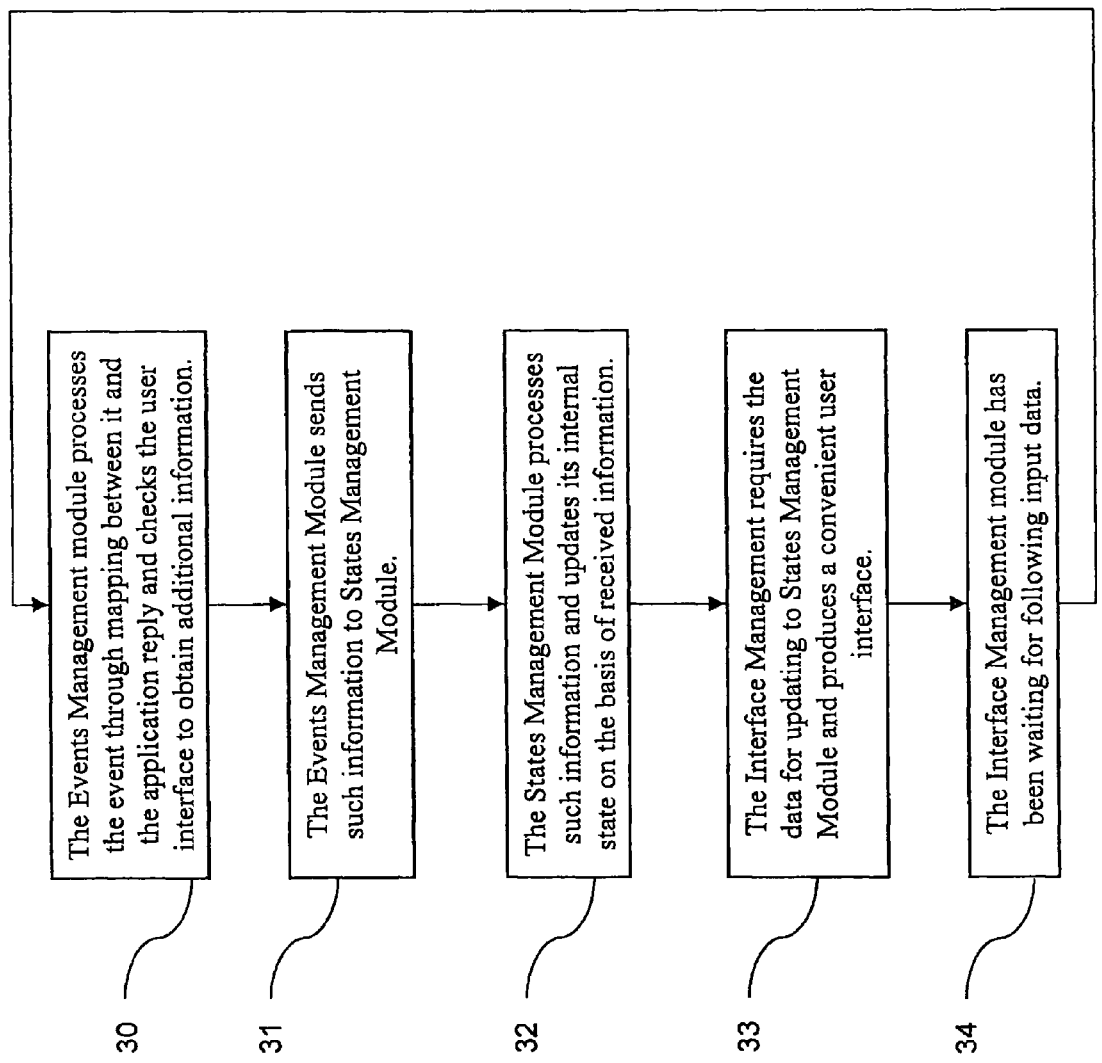
FIG. 3 Shows the flow chart of generation and execution of the action routine according to the present invention.

The generation and execution of action, step e) of sequence described in FIG. 2, occurs in accordance with the sequence explained following in FIG. 3:

g) The Events Management module processes the event 30 through mapping between it and the application reply, so that every event/action is joined to a corresponding action into the user interface that involves a change of data and in case a change of user interface itself.

h) The Events Management Module 31 sends such information to States Management Module.

i) The States Management Module 32 processes such information and updates its internal state on the basis of received information; said Events Management Module informs the States Management Module that owing to the user action, changes of application states on said user interface need.

j) The Interface Management 33 requires the data for updating to States Management Module and produces a convenient user interface.

k) The Interface Management module 34 has been waiting for following input data.

In particular are described below two methods of cursor positioning and text selection, integral part of this patent, that allow formatting text document quick and efficient using just the gaze control.

Figure 4:
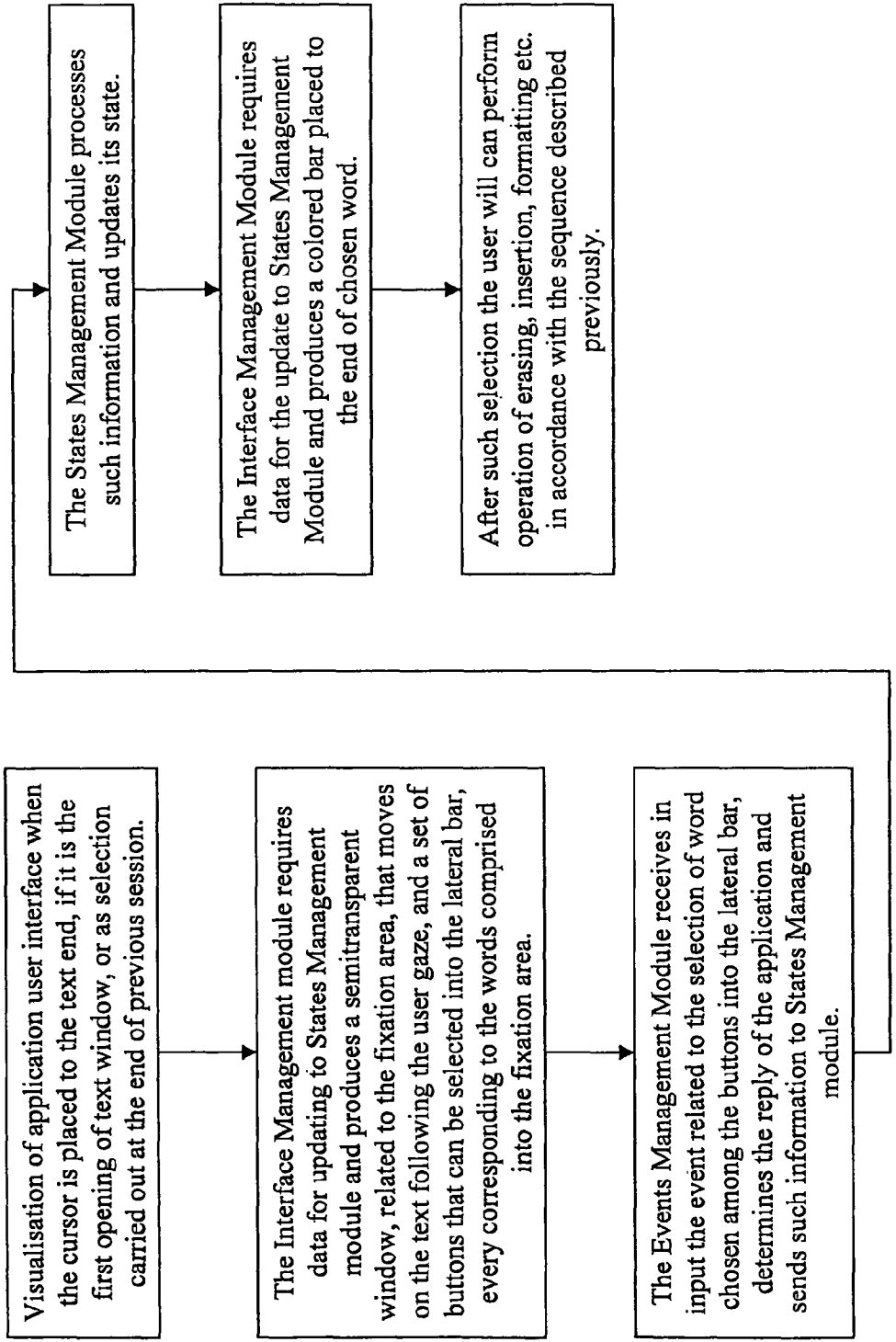
FIG. 4 Shows the flow chart of cursor positioning routine.

Referring to FIG. 4, the cursor positioning—that is placed to the end of text displayed on said user interface, if it is the first opening of text window, or placed as selection carried out at the end of previous session—occurs in accordance with the steps, that explain previous step j) described following. After this positioning the user will can carry out some operation of erasing, insertion, etc. . . . , usually performed during text processing.

l) The Interface Management module requires data for the update to States Management module and produces a semitransparent window, related to the fixation area, that moves on the text following the user gaze, and a set of buttons that can be selected into the lateral bar, every corresponding to the words included into the fixation area. parole contenute nell'area di fissazione stessa.

m) The Events Management Module receives in input the event related to the selection of word chosen among the buttons into the lateral bar, determines the reply of the application and sends such information to States Management module.

n) The States Management Module processes such information and updates its state.

o) The Interface Management Module requires data for the update to States Management Module and produces a colored bar placed to the end of chosen word.

Figure 5:
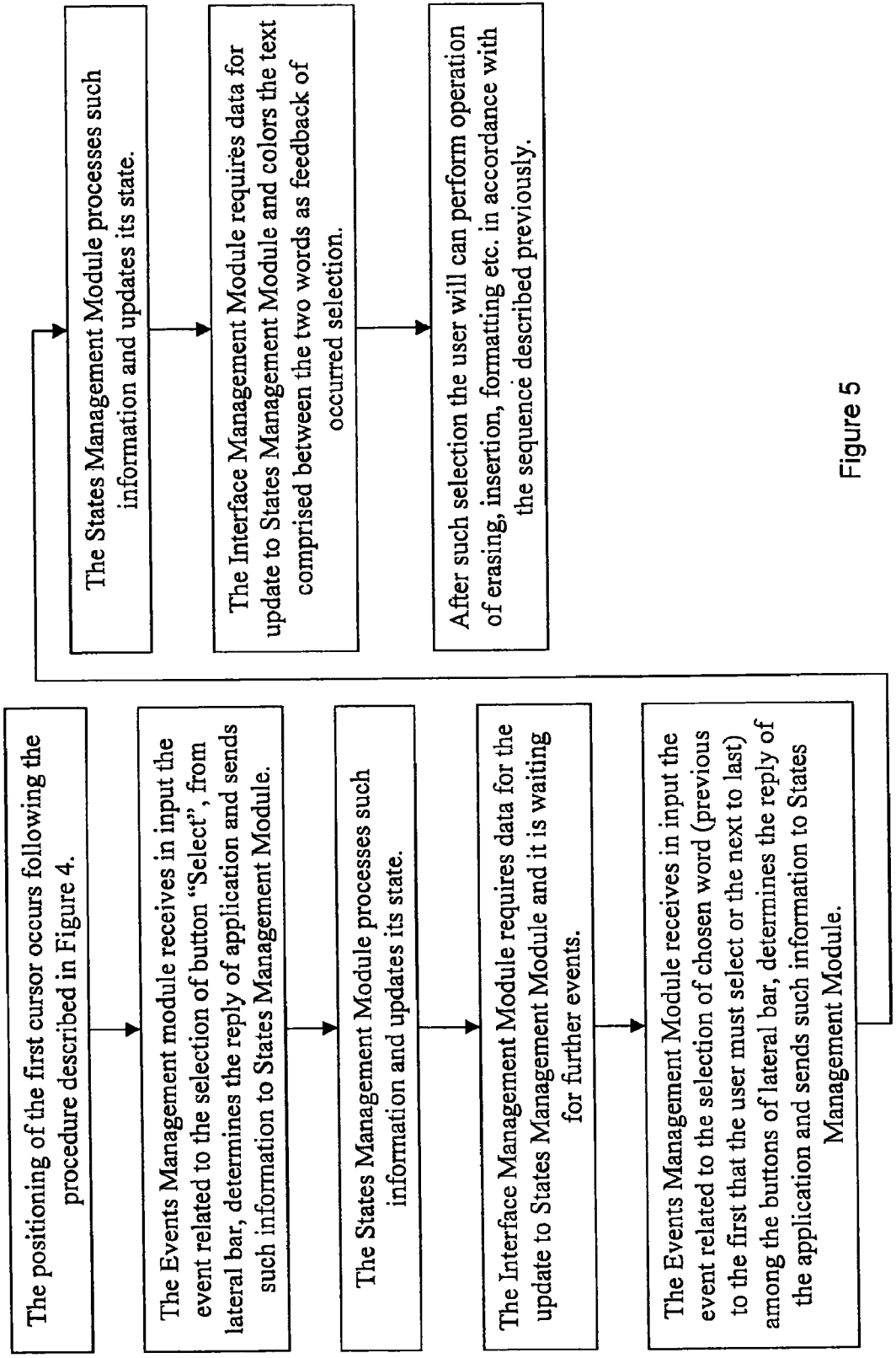
FIG. 5 Shows the flow chart of cursor positioning routine for text selection (multiple selection).

Referring to FIG. 4 attached, the positioning of the cursor for the text selection (FIG. 5), occurs following the procedure described previously (step l-o) for the positioning of the first cursor to the start/end of text to select and afterwards following the steps explained below, as result of changes to step j and subsequent.

p) The Events Management module receives in input the event related to the selection of button "Select", from lateral bar, determines the reply of application and sends to States Management Module such information. Il modulo q) The States Management Module processes such information and updates its state.

r) The Interface Management Module requires data for updating to States Management Module and it is waiting for further events.

s) The Events Management Module receives in input the event related to the selection of chosen word (previous to the first that the user must select or the next to last) among the buttons of lateral bar, determines the reply of the application and sends such information to States Management Module.

t) The States Management Module processes such information and updates its state.

u) The Interface Management Module requires data for update to States Management Module and colours the text included between the two words as feedback of occurred selection.

After such selection the user will can perform operation of erasing, insertion, formatting etc. in accordance with the sequence described previously.

The invention claimed is:

1. A method for the text documents processing based on optimized positioning of cursor, to be performed by means of electronic processing of data and information provided with means for visualization of data comprising an eye tracker device, said method comprising the following steps:

a) displaying a user interface on suitable means of visualization associated to said means of electronic processing of data and information, said user interface is configured to allow the user to interact with said eye tracker device associated to said electronic processor;
b) calculating user gaze coordinates, as raw data, from said eye tracking device, and representing the user gaze coordinates, along the two Cartesian axis, obtained with the frequency typical of said eye tracking device;
c) filtering raw data related to said user gaze coordinates so that the raw data related to said user gaze coordinates is more stable and suitable to provide information about user fixations, that is the number of user gaze around a certain area;
d) sending the filtered data coming from step c) to a set action module;
e) processing, by an events management module, an incoming event through mapping between itself and an application reply, so that every event/action is associated to a corresponding action on the user interface that involves a change of data and in case a change of user interface itself;
f) sending, by the events management module, information to a states management module;
g) processing, by the states management module, the information and updating its internal state on the basis of received information;
h) requiring, by an interface management module, the data for the updating to the states management module and producing a suitable user interface;
i) putting the interface management module on wait of input data;
j) repeating steps from b) through i); characterized in that said step h) comprises:
   requesting, by the interface management module, data for the updating to the states management module and producing a semitransparent window, related to a fixation area, that moves on the text following the user gaze, and a set of buttons, into the lateral bar, that can be selected, each of them corresponding to the words included into the fixation area,
   receiving, by the events management module, in input the event related to the selection of word chosen among the buttons into the lateral bar, determining the reply of the application and sends such information to the states management module, the states management module processes such information and updates its own state, and
   requesting, by the interface management module, data for the updating to the states management module and producing a coloured bar placed at the beginning or at the end of the chosen word.

2. The method according to claim 1 wherein said step h) further comprises the following steps:
   receiving, by the events management module, in input the event related to the selection of button "Select" from lateral bar, determining the reaction of the application and sends such information to the states management module,
   processing, by the states management module, such information and updating its own state,
   requesting, by the interface management module, the data for the updating to the states management module and putting itself on wait for further events,
   receiving, by the events management module, in input the event related to the selection of the chosen word among the buttons selectable in the lateral bar, determining the reaction of the application and sends such information to the states management module,
   processing, by the states management module, such information and updating its own state, and
   requesting, by the interface management module, data for updating to the states management module and colours the text comprised between the two words as feedback of the selection made.

3. The method according to claim 1, further comprises:
   performing an action chosen among group comprising: erasing, insertion, formatting words or text portions.

4. The method according to claim 3, further comprises:
   performing an action chosen among group comprising: erasing, insertion, formatting words or text portions.

* * * * *